(12) United States Patent  
Rayner et al.

(10) Patent No.: US 8,122,716 B2  
(45) Date of Patent: Feb. 28, 2012

(54) VNT FLOW CALIBRATION ADJUSTMENT

(75) Inventors: Patrick Rayner, Lomita, CA (US); Laurent Li, Shanghai (CN); Songter Li, Shanghai (CN)

(73) Assignee: Honeywell International Inc., Morristown, NJ (US)

(*) Notice: Subject to any disclaimer, the term of this patent is extended or adjusted under 35 U.S.C. 154(b) by 936 days.

(21) Appl. No.: 12/132,844

(22) Filed: Jun. 4, 2008

(65) Prior Publication Data  
US 2009/0301083 A1 Dec. 10, 2009

(51) Int. Cl.  
F02D 23/00 (2006.01)

(52) U.S. Cl. .......................................... 60/602; 415/150

(58) Field of Classification Search ................ 60/602; 415/150, 159–165  
See application file for complete search history.

(56) References Cited

U.S. PATENT DOCUMENTS

| | | | |
|---|---|---|---|
| 2,277,255 A * | 3/1942 | Rudert et al. | 415/163 |
| 2,854,211 A * | 9/1958 | Bendersky | 415/160 |
| 3,146,989 A * | 9/1964 | Boyd | 415/163 |
| 3,300,966 A * | 1/1967 | Chadwick | 415/160 |
| 4,299,534 A * | 11/1981 | Yamane et al. | 415/165 |
| 4,618,311 A * | 10/1986 | Miura et al. | 415/162 |
| 5,996,347 A * | 12/1999 | Nagae et al. | 60/602 |
| 6,397,597 B1 * | 6/2002 | Gartner | 60/602 |
| 6,506,011 B1 * | 1/2003 | Sishtla | 415/150 |
| 6,594,996 B2 * | 7/2003 | Yang | 60/602 |
| 6,669,442 B2 * | 12/2003 | Jinnai et al. | 415/160 |
| 7,428,839 B2 * | 9/2008 | Figura | 73/114.39 |
| 2006/0137341 A1 * | 6/2006 | Greentree | 60/602 |
| 2008/0110169 A1 * | 5/2008 | Roh | 60/600 |
| 2009/0238681 A1 * | 9/2009 | Bouru | 415/150 |
| 2010/0014961 A1 * | 1/2010 | Boning et al. | 415/160 |
| 2010/0080694 A1 * | 4/2010 | Chapman et al. | 415/160 |

* cited by examiner

Primary Examiner — Mary A Davis  
(74) Attorney, Agent, or Firm — Brian J. Pangrle

(57) ABSTRACT

An exemplary variable geometry turbine includes a turbine wheel; a variable geometry assembly that includes a rotatable control ring that has a slot and a plurality of vanes where each vane has a post pivotably controlled by rotation of the control ring and where adjacent vanes define nozzles to direct exhaust gas to the turbine wheel; a crankshaft that has a pin for receipt by the slot of the control ring where rotation of the crankshaft rotates the control ring; and a center housing that includes a rotatable stop fixed to the crankshaft and having a close stop surface, a secure component and a translatable shaft where the translatable shaft comprises an engagement mechanism to engage the rotatable stop; where translation of the shaft causes rotation of the crankshaft and where the close stop surface establishes a contact with the secure component to limit rotation of the crankshaft and to establish a closed limit for the vanes. Various other exemplary methods, devices, systems, etc., are also disclosed.

8 Claims, 4 Drawing Sheets

VNT FLOW CALIBRATION ADJUSTMENT

FIELD OF THE INVENTION

Subject matter disclosed herein relates generally to turbochargers with variable geometry mechanisms, for example, to adjust flow of exhaust to a turbine.

BACKGROUND

Exhaust gas driven turbochargers include a rotating shaft carrying a turbine wheel and a compressor wheel, which is rotatably supported within a center housing by one or more bearings. During operation, exhaust gas from an internal combustion engine drives a turbocharger's turbine wheel, which, in turn, drives the compressor wheel to boost charge air to the internal combustion engine.

For increased performance (e.g., power, emissions, etc.), some turbochargers include a variable geometry mechanism positioned in an exhaust flow path to a turbine wheel. The terms variable nozzle turbine (VNT) and variable geometry turbine (VGT) are often used to refer to such a mechanism. A VNT typically includes pivotable vanes where each vane has a pair of surfaces extending from a leading edge to a trailing edge where a surface of one vane and a surface of an adjacent vane form a nozzle. As the vanes pivot, the nozzles change shape. In other words, as the vanes pivot, the geometry of the nozzles varies.

A VNT operates in a harsh and changing environment. Exhaust temperatures cycle with operating conditions (e.g., acceleration, deceleration, demand, etc.) and may exceed 500° C. A variable geometry mechanism should be robust and capable of handling environmental and operational conditions. A robust mechanism should be capable of controlling geometry precisely; in a manner that does not vary significantly from unit to unit. Various exemplary methods, devices, systems, etc., described herein pertain to variable geometry mechanisms with improved control and durability.

BRIEF DESCRIPTION OF THE DRAWINGS

A more complete understanding of the various methods, devices, systems, arrangements, etc., described herein, and equivalents thereof, may be had by reference to the following detailed description when taken in conjunction with the accompanying drawings wherein.

DETAILED DESCRIPTION

Various exemplary methods, devices, systems, arrangements, etc., disclosed herein address issues related to technology associated with turbochargers. Turbochargers are frequently utilized to increase the output of an internal combustion engine. A turbocharger generally acts to extract energy from the exhaust gas and to provide energy to intake air, which may be combined with fuel to form combustion gas.

Figure 1:
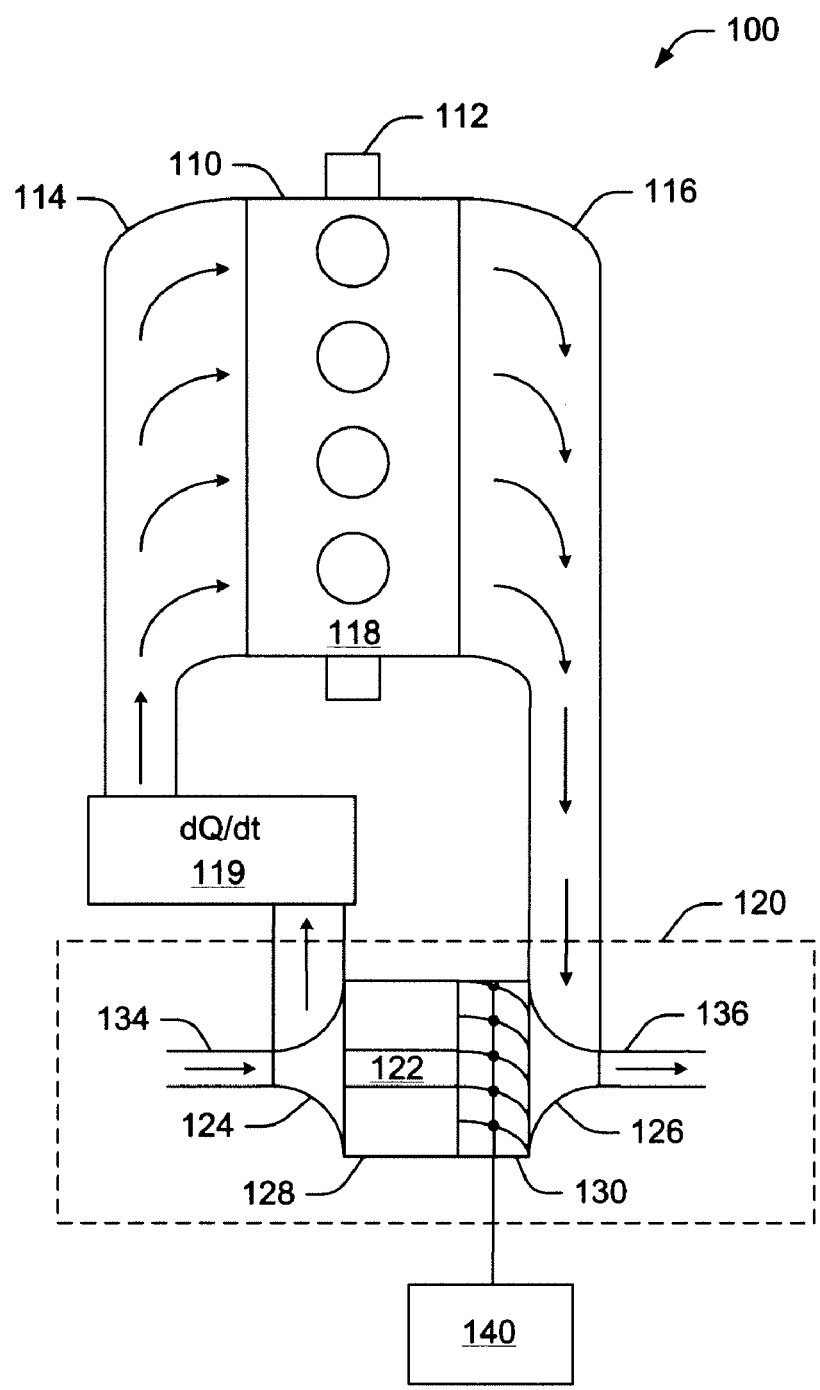
FIG. 1 is a diagram of an internal combustion engine and turbocharger system.

Referring to FIG. 1, a prior art system 100, including an internal combustion engine 110 and a turbocharger 120 is shown. The internal combustion engine 110 includes an engine block 118 housing one or more combustion chambers that operatively drive a shaft 112. As shown in FIG. 1, an intake port 114 provides a flow path for air to the engine block 118 while an exhaust port 116 provides a flow path for exhaust from the engine block 118. A heat exchanger or cooler 119 may be positioned to cool air prior to entering the engine 110.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor 124, a turbine 126, a housing 128 and an exhaust outlet 136. The housing 128 may be referred to as a center housing as it is disposed between the compressor 124 and the turbine 126. The shaft 122 may be a shaft assembly that includes a variety of components.

A variable geometry unit 130 and a variable geometry controller 140 allow for control of vanes, nozzles, etc., as explained in the Background section. The variable geometry unit 130 and the variable geometry controller 140 optionally include features such as those associated with commercially available variable geometry turbochargers (VGTs). Commercially available VGTs include, for example, the GARRETT® VNT™ and AVNT™ turbochargers, which use multiple adjustable vanes to control the flow of exhaust across a turbine. An exemplary turbocharger may employ wastegate technology as an alternative or in addition to variable geometry technology.

As described herein, an exemplary mechanism allows for precise control of a variable geometry unit. Precise flow control or adjustment is desirable to reduce unit to unit variation and to provide a more repeatable product. In the context of FIG. 1, a repeatable product facilitates an engine manufacturer's ability to achieve an emissions target.

More specifically, an exemplary mechanism includes an arrangement of components that limits travel of a crankshaft that actuates a variable geometry mechanism. In a particular example, the mechanism includes a stop and setscrew that limit travel of a crankshaft. Such components can be optionally implemented in conjunction with a conventional cam/gear arrangement of a conventional variable geometry unit.

The aforementioned AVNT mechanism typically does not have an adjustable flow setting. Instead, such an AVNT relies on vane tabs bottoming in unison ring slots, an arrangement that stacks-up a series of components. According to an exemplary stop and setscrew arrangement, by stopping rotation at the cam/gear, the number of components in the stack-up is reduced. This can reduce unit to unit variation. Another benefit of stopping travel at the cam/gear is that the components downstream of the stop do not have to withstand full actuator torque, which can reduce component wear.

Figure 2:
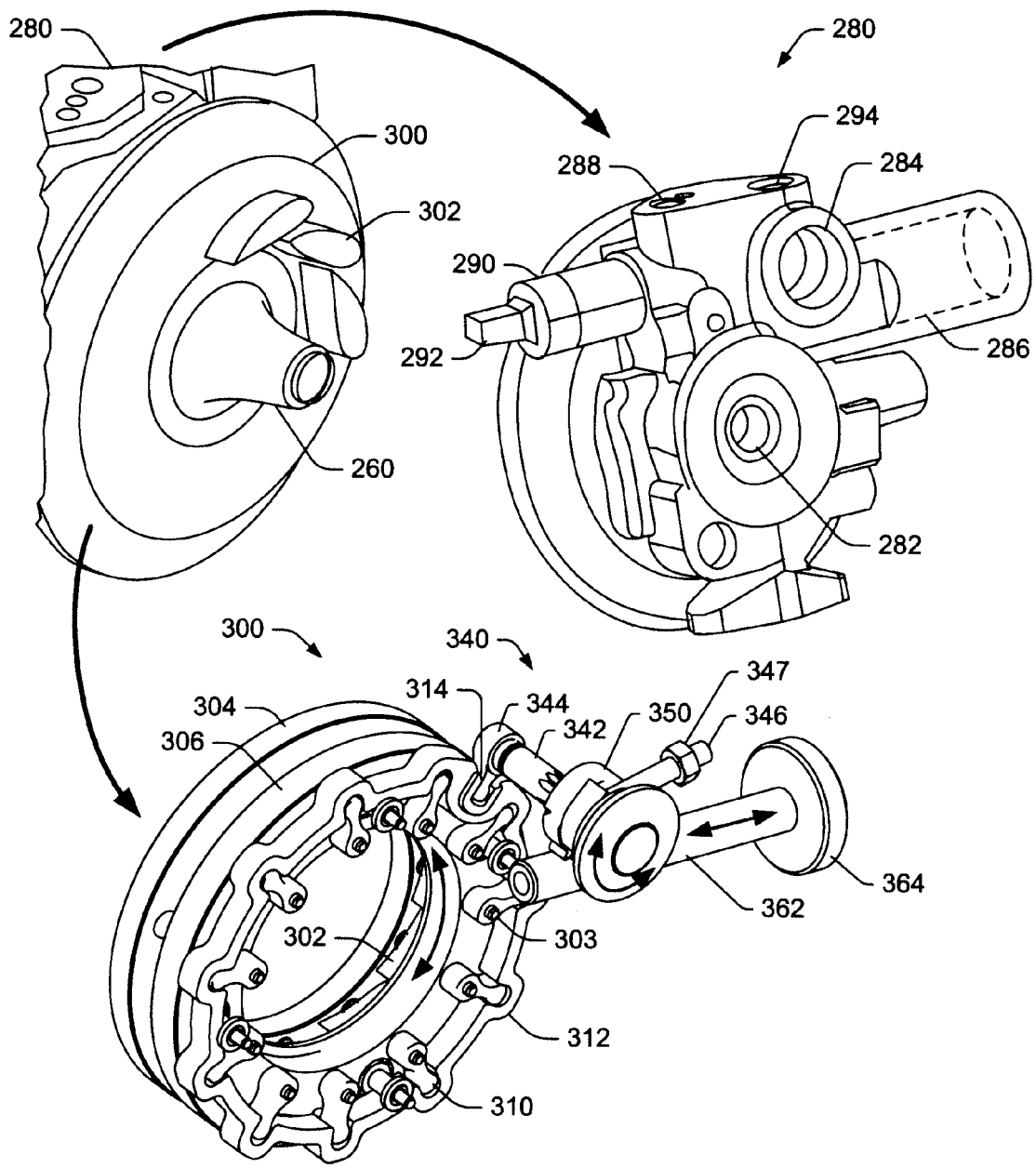
FIG. 2 is a series of perspective views of various components associated with an exemplary mechanism.

FIG. 2 shows an exemplary mechanism 200 in conjunction with various conventional variable geometry components. An exemplary center housing 280 houses various components for actuating a variable geometry assembly 300 that includes a plurality of vanes 302 oriented with respect to a turbine wheel 260.

The center housing 280 includes a shaft bore 282 configured to receive a turbocharger shaft (e.g., shaft 122 of the turbocharger 120 of FIG. 1), a crankshaft bore 284 configured to receive a crankshaft 342 for actuating a variable geometry assembly 300, and a piston cylinder 286 to receive a piston shaft 362 and a piston head 364.

The center housing 280 also includes fluid ports 288 and a fluid port controller 290 that includes a connector 292 for receiving power and control signals. A control signal can cause the fluid port controller 290 to allow fluid to flow in the center housing 280. For example, such an arrangement can cause fluid to flow to the piston cylinder 286 where pressure causes movement of the piston head 364 and the attached piston shaft 362. In turn, translation of the piston shaft 362 causes the crankshaft 342, via an engagement mechanism, to rotate and actuate the variable geometry assembly 300. In the example of FIG. 2, rotation of the crankshaft 342 causes a lever arm and pin 344 to actuate the variable geometry assembly 300. With respect to position feedback, a sensor (see, e.g., FIG. 3) may be positioned in the opening 294 of the center housing 280.

While not shown in FIG. 2, a turbine housing is typically connected to the center housing 280, for example, using multiple clamps secured by bolts. The turbine housing houses, at least in part, the turbine wheel 260. Exhaust gas or other high energy gas supplying the turbocharger enters the turbine housing through an inlet and is distributed through the volume in the turbine housing for substantially radial entry into the turbine wheel through a circumferential nozzle array, as determined by the variable geometry assembly 300.

With respect to the variable geometry assembly 300, the vanes 302 reside between an upper ring 304 and a lower ring 306. A post 303 extends from each of the vanes 302 to engage a lobed component 310 set in a control ring 312. The control ring 312 further includes a slot 314 to receive the lever arm and pin 344. Rotation of the crankshaft 342 causes movement of the lever arm and pin 344 in the slot 314, which, in turn, causes rotation of the control ring 312 and pivoting of the vanes 302 about their respective posts 303.

In FIG. 2, a subassembly 340 includes the crankshaft 342, the lever arm and pin 344, a setscrew 346 (or bolt), a nut 347 and a cam/gear/stop component 350, which may be an integral component or an assembly of components. The subassembly 340 meshes with the piston shaft 362 via an engagement mechanism (e.g., a rack gear on the piston shaft 362 and gear teeth on the cam/gear/stop component 350).

Figure 3:
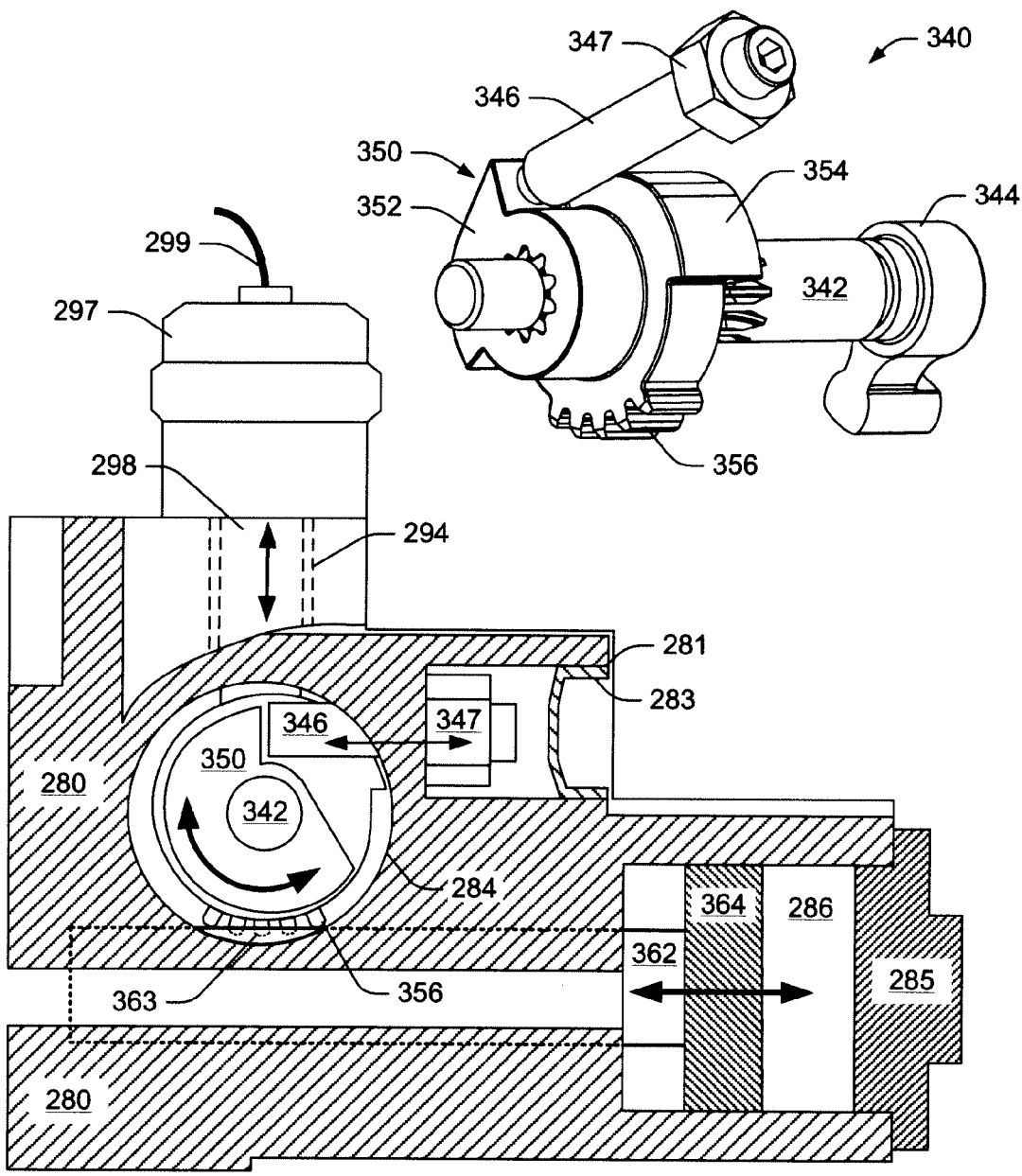
FIG. 3 is a perspective view and a cross-sectional view of various components of the exemplary mechanism of FIG. 2.

FIG. 3 shows various components of the exemplary mechanism 200 of FIG. 2 in a cross-sectional view and in a perspective view. The perspective view shows the subassembly 340, identifying a stop 352, a cam 354 and gear teeth 356 of the component 350. As explained, translational movement of the shaft 362 causes, via an engagement mechanism, rotation of the crankshaft 342. The engagement mechanism may include gear teeth 356 that engage a rack gear 363 of the piston shaft 362. In the example of FIG. 3, rotation of the crankshaft 342 stops once a contact is established between the setscrew 346 and the stop 352. In other words, the stop 352 may operate to stop clockwise and/or counter-clockwise rotation of the crankshaft 342.

In FIG. 3, the center housing 280 includes a bore 281 configured to receive the setscrew 346 (or bolt) and the nut 347. A cap 283 may be positioned to seal the bore 281. The piston cylinder 286 is also shown as being sealed by an end cap 285, noting that alternative arrangements are possible (e.g., piston ring seal, etc.). The center housing 280 is also shown as having a sensor 297 positioned in the opening 294. In this example, the sensor 297 includes a shaft 298 that seats against a surface of the cam 354 such that rotation of the cam 354 causes movement of the shaft 298. In turn, a control signal emanates from the sensor 297 via a control line 299.

As an alternative, translational movement of the shaft 362 may be limited or stopped by contact between the piston head 364 and the end cap 285. Further, the end cap 285 may be adjustable with respect to the piston cylinder 286 to thereby allow for adjustment of the stop position of the shaft 362 and, correspondingly, the crankshaft 342. For example, the exemplary mechanism 200 of FIG. 3 may rely on the component 350 to stop rotation of the crankshaft 342 in one direction and rely on the end cap 285 to stop rotation of the crankshaft 342 in an opposite direction. As configured in the example of FIG. 3, such a mechanism can have a close stop defined by a contact between the component 350 (rotational stop) and the setscrew 346 (or bolt) and an open stop defined by a contact between the piston head 364 and the end cap 285 (translational stop). Hence, an exemplary mechanism may include a rotational stop mechanism and a translational stop mechanism.

Figure 4:
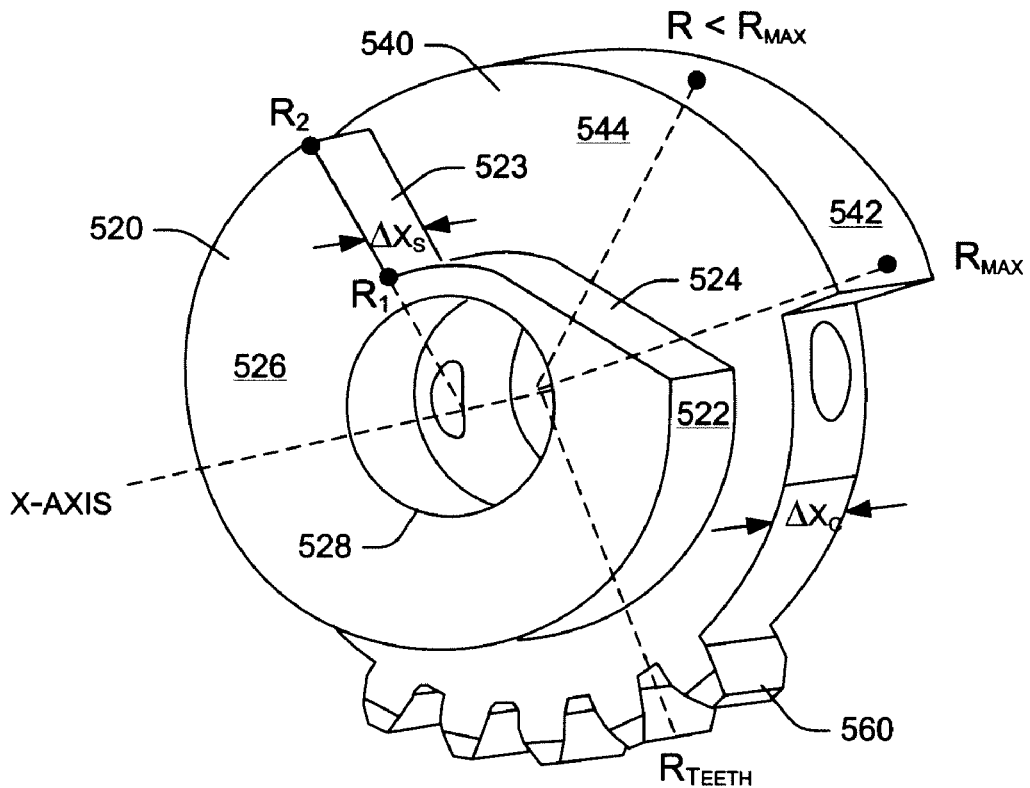
FIG. 4 is a perspective view of an exemplary component along with an operational diagram that shows a close position and an open position.
Figure 4:
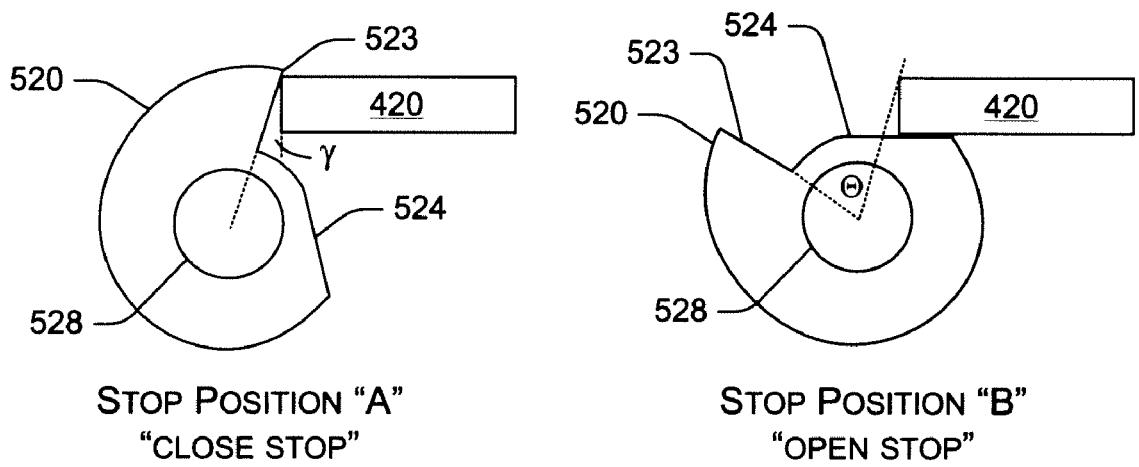

FIG. 4 shows a perspective view of the exemplary component 500 in a cylindrical coordinate system with coordinate x, r and θ. The component 500 rotates plus or minus degrees θ about the x-axis.

The component 500 includes a stop 520, a cam 540 and an engagement mechanism 560. The stop 520 includes a surface 522 that is substantially a portion of an outer surface of a cylinder (e.g., disposed at a radius that may vary with respect to θ). The surface 522 meets a "close stop" surface 523 that extends toward the x-axis from an outer radius ($R_2$) to an inner radius ($R_1$). In the example of FIG. 4, the close stop surface 523 has an axial width $\Delta x_s$. The close stop surface 523 then meets another surface that includes an "open stop" surface 524. As mentioned with respect to FIG. 3, the piston 364 can form a contact with the end cap 285 to act as an "open stop" to stop rotation of the crankshaft 342. As described herein, an exemplary assembly may rely on a surface of a rotating component or the surface of a translating component to define an open stop for a variable geometry mechanism (e.g., the vanes 302 of FIG. 2).

As shown in FIG. 4, upon clockwise rotation of the component 500, the close stop surface 523 contacts a secured component 420 (e.g., the setscrew 346); whereas upon counter-clockwise rotation, the open stop surface 524 contacts the secured component 420.

The close stop surface 523 contacts the secured component 420 at an angle γ (e.g., which may be 0 or some other angle). Similarly, the open stop surface 524 may contact the secured component 420 at an angle.

As indicated, the close stop surface 523 and the open stop surface 524 are configured to allow for a particular range of motion, expressed as angle θ. The range of motion may be determined in part by the position of the secured component 420. For example, as shown in FIG. 3, the setscrew 346 (or bolt) may be adjusted (e.g., via the nut 347). In operation, the secured component 420 and the stop 520 bear the force of actuation when the vanes are adjusted to a closed limit (e.g., the end of the secured component 420 and the surface 523) or to an open limit (e.g., a side portion of the secured component 420 and the surface 524).

The secured component 420 may be a bolt having sufficiently durable material properties. The secured component 420 may be set firmly in the center housing. The stop 520 may have sufficiently durable material properties as well.

The exemplary component 500 shifts torque and corresponding wear away from components of the variable geometry assembly 300 (downstream) and brings the torque and corresponding wear closer to the source of actuation (e.g., upstream, in a center housing).

FIG. 4 also shows various aspects of the cam 540. In particular, the cam 540 includes an outer surface 542 disposed at a radius that increases to $R_{max}$ at an angle θ about the x-axis. Upon rotation of the cam 540, the outer surface 542 can cause the plunger or shaft of a sensor to translate in a manner related to the rotational position of a crankshaft.

In the example of FIG. 4, the stop 520 includes a substantially flat surface 526 disposed in an r-θ plane an axial distance from a substantially flat surface 544 of the cam 540, also disposed in an r-θ plane. The component 500 may be an integral component or separate components. For example, the stop 520 and the cam 540 may be separate components mounted on a common crankshaft. The stop 520 and the cam 540 may be mounted adjacent to each other or they may be separated by some axial distance.

As shown in FIG. 4, the component 500 includes an aperture to receive a crankshaft. Further, depending on the configuration of the component 500, one or more setscrews may be used to secure the component to a crankshaft. For example, the stop 520 may be welded (or otherwise bonded) to the cam 540. In such an example, the cam 540 may have an aperture configured to receive a setscrew to secure the cam 540 and the stop 520 to a crankshaft.

While various examples show gear teeth and a rack gear as an engagement mechanism, other engagement mechanisms may be used. In general, an engagement mechanism provides for rotation of a stop, which may be connected to, or integral to, a cam.

As described herein, a stop for limiting rotation of a crankshaft for adjusting geometry of a variable geometry turbine includes an aperture for receiving the crankshaft where the crankshaft has a rotational axis and wherein the aperture is centered on the rotational axis, and a close stop surface extending from a first radius from the rotational axis to a second radius from the rotational axis, the close stop surface having a width in the axial direction where the close stop surface establishes a contact with a secured component set in a center housing of a turbocharger to limit rotation of the crankshaft and, correspondingly, to establish a close position for the variable geometry turbine. Such a stop optionally includes a cam. For example, the cam can include an aperture for receiving the crankshaft where the aperture is centered on the rotational axis of the crankshaft.

An exemplary stop optionally includes an open stop surface that establishes a contact with a secured component set in a center housing of a turbocharger to limit rotation of a crankshaft and, correspondingly, to establish an open position for a variable geometry turbine.

In an example that includes a close stop surface and an open stop surface, an angle θ exists between the close stop surface and the open stop surface upon establishment of their respective contacts with a secured component. In such an example, adjustment of the secured component alters the angle θ.

As described herein, a variable geometry turbine includes a turbine wheel, a variable geometry assembly that includes a rotatable control ring that has a slot and a plurality of vanes where each vane has a post pivotably controlled by rotation of the control ring and where adjacent vanes define nozzles to direct exhaust gas to the turbine wheel, a crankshaft that has a pin for receipt by the slot of the control ring where rotation of the crankshaft rotates the control ring and a center housing that includes a rotatable stop fixed to the crankshaft and having a close stop surface, a secure component and a translatable shaft where the translatable shaft has an engagement mechanism to engage the rotatable stop, where translation of the shaft causes rotation of the crankshaft and where the close stop surface establishes a contact with the secure component to limit rotation of the crankshaft and to establish a closed limit for the vanes.

The aforementioned variable geometry turbine optionally includes a cam fixed to the crankshaft where the cam cooperates with a vane position sensor.

An exemplary variable geometry turbine optionally includes an open stop surface that establishes a contact with a secured component to limit rotation of a crankshaft and to establish an open limit for vanes. In an example that includes a close stop surface and an open stop surface, an angle θ exists between the close stop surface and the open stop surface upon establishment of their respective contacts with a secured component. In general, adjustment of the secured component alters the angle θ.

An exemplary method includes actuating a variable geometry turbine controller to arrive at a close position, in response to the actuating, rotating a stop fixed to a crankshaft positioned in a center housing of the variable geometry turbine and, in response to the rotating, contacting the stop and a secure component set in the center housing to stop the rotation of the crankshaft and to arrive at the close position of the variable geometry turbine.

An exemplary method may include actuating a variable geometry turbine controller to arrive at an open position, in response to the actuating, rotating a stop fixed to a crankshaft positioned in a center housing of the variable geometry turbine and, in response to the rotating, contacting the stop and a secure component set in the center housing to stop the rotation of the crankshaft and to arrive at the open position of the variable geometry turbine.

In various methods, rotating can include rotating a cam fixed to the crankshaft. Such an example may include sensing the position of the cam.

An exemplary method may include adjusting the position of the secured component to thereby alter the close position. For example, such adjusting may be to target an emission standard.

An exemplary method can include contacting between a stop and a secured component that prevents downstream components of a variable geometry turbine from experiencing torque and associated wear.

An exemplary method can include actuating that occurs in response to an operational condition of an internal combustion engine.

The invention claimed is:

1. A variable geometry turbine comprising:
   a turbine wheel;
   a variable geometry assembly that comprises a rotatable control ring that comprises a slot and a plurality of vanes wherein each vane comprises a post pivotably controlled by rotation of the control ring and wherein adjacent vanes define nozzles to direct exhaust gas to the turbine wheel;
   a crankshaft that comprises a pin for receipt by the slot of the control ring wherein rotation of the crankshaft rotates the control ring; and
   a center housing that comprises a rotatable stop fixed to the crankshaft and having a close stop surface and an open stop surface, a secure component and a translatable shaft wherein the translatable shaft comprises an engagement mechanism to engage the rotatable stop;
   wherein translation of the translatable shaft causes rotation of the crankshaft,
   wherein the close stop surface establishes a contact with the secure component to limit rotation of the crankshaft and to establish a closed limit for the vanes,
   wherein the open stop surface establishes a contact with the secured component to limit rotation of the crankshaft and to establish an open limit for the vanes, wherein an angle Θ exists about the rotational axis between the close stop surface and the open stop surface upon establishment of their respective contacts with the secured component, and wherein adjustment of the secured component alters the angle Θ.

2. The variable geometry turbine of claim 1 further comprising a cam fixed to the crankshaft wherein the cam cooperates with a vane position sensor.

3. A method of controlling a variable geometry turbine comprising:

actuating a variable geometry turbine controller to arrive at a close position;

in response to the actuating, rotating a stop fixed to a crankshaft positioned in a center housing of the variable geometry turbine;

in response to the rotating, contacting the stop and a secure component set in the center housing to stop the rotation of the crankshaft and to arrive at the close position of the variable geometry turbine;

actuating the variable geometry turbine controller to arrive at an open position;

in response to the actuating, rotating the stop fixed to the crankshaft positioned in the center housing of the variable geometry turbine;

in response to the rotating, contacting the stop and the secure component set in the center housing to stop the rotation of the crankshaft and to arrive at the open position of the variable geometry turbine; and adjusting the position of the secured component to thereby alter the close position and an angle Θ that exists about the rotational axis between the close stop surface and the open stop surface upon establishment of their respective contacts with the secured component.

4. The method of claim 3 wherein the rotating comprises rotating a cam fixed to the crankshaft.

5. The method of claim 4 further comprising sensing the position of the cam.

6. The method of claim 3 wherein the adjusting comprises adjusting to target an emission standard.

7. The method of claim 3 wherein the contacting prevents downstream components of the variable geometry turbine from experiencing torque and associated wear.

8. The method of claim 3 wherein the actuating occurs in response to an operational condition of an internal combustion engine.

* * * * *